United States Patent [19]

Newbigging

[11] Patent Number: 4,974,474
[45] Date of Patent: Dec. 4, 1990

[54] PNEUMATIC CONTROL SYSTEM FOR RANGE TYPE COMPOUND TRANSMISSION

[75] Inventor: Ian M. Newbigging, Bolton, England
[73] Assignee: Eaton Corporation, Cleveland, Ohio
[21] Appl. No.: 322,028
[22] Filed: Mar. 13, 1989
[51] Int. Cl.[5] ............................................. B60K 41/04
[52] U.S. Cl. ........................................ 74/867; 74/335; 74/868; 74/878
[58] Field of Search ............... 74/335, 336 R, 878, 74/867, 868

[56] References Cited

U.S. PATENT DOCUMENTS

| | | | |
|---|---|---|---|
| 2,654,268 | 10/1953 | Perkins | 74/745 |
| 3,105,395 | 10/1963 | Perkins | 74/745 |
| 3,138,965 | 6/1964 | Brey et al. | 74/331 |
| 3,171,300 | 3/1965 | Perkins et al. | 74/745 |
| 3,283,613 | 11/1966 | Perkins | 74/331 |
| 3,939,722 | 2/1976 | Stromberg | 74/336 R |
| 4,060,005 | 11/1977 | Bost | 74/745 |
| 4,579,015 | 4/1986 | Fukui | 74/335 X |
| 4,614,126 | 9/1986 | Edelen et al. | 74/333 |
| 4,621,537 | 11/1986 | Piazza et al. | 74/477 |
| 4,685,357 | 8/1987 | Sawada et al. | 74/867 |
| 4,706,523 | 11/1987 | Nishikawa et al. | 74/867 X |
| 4,722,237 | 2/1988 | McNinch, Jr. | 74/335 X |
| 4,748,863 | 6/1988 | McNinch, Jr. | 74/335 |
| 4,754,665 | 7/1988 | Vandervoort | 74/745 |
| 4,788,889 | 12/1988 | Davis et al. | 74/335 X |

FOREIGN PATENT DOCUMENTS

| | | | |
|---|---|---|---|
| 1136780 | 12/1968 | United Kingdom | 74/335 |
| 2019509 | 10/1979 | United Kingdom | 74/878 |

*Primary Examiner*—Leslie A. Braun
*Assistant Examiner*—Benjamin Levi
*Attorney, Agent, or Firm*—H. D. Gordon

[57] ABSTRACT

A pneumatic control system for a range type compound transmission (10) is provided allowing preselection of a range section (14) shift by a range shift selector mechanism (98) and including an exhaust conduit control valve (118) which will prevent exhausting of one of the range actuator cylinder portions (120R, 120L) to atmosphere until the main transmission section (12) is shifted to a neutral condition.

13 Claims, 5 Drawing Sheets

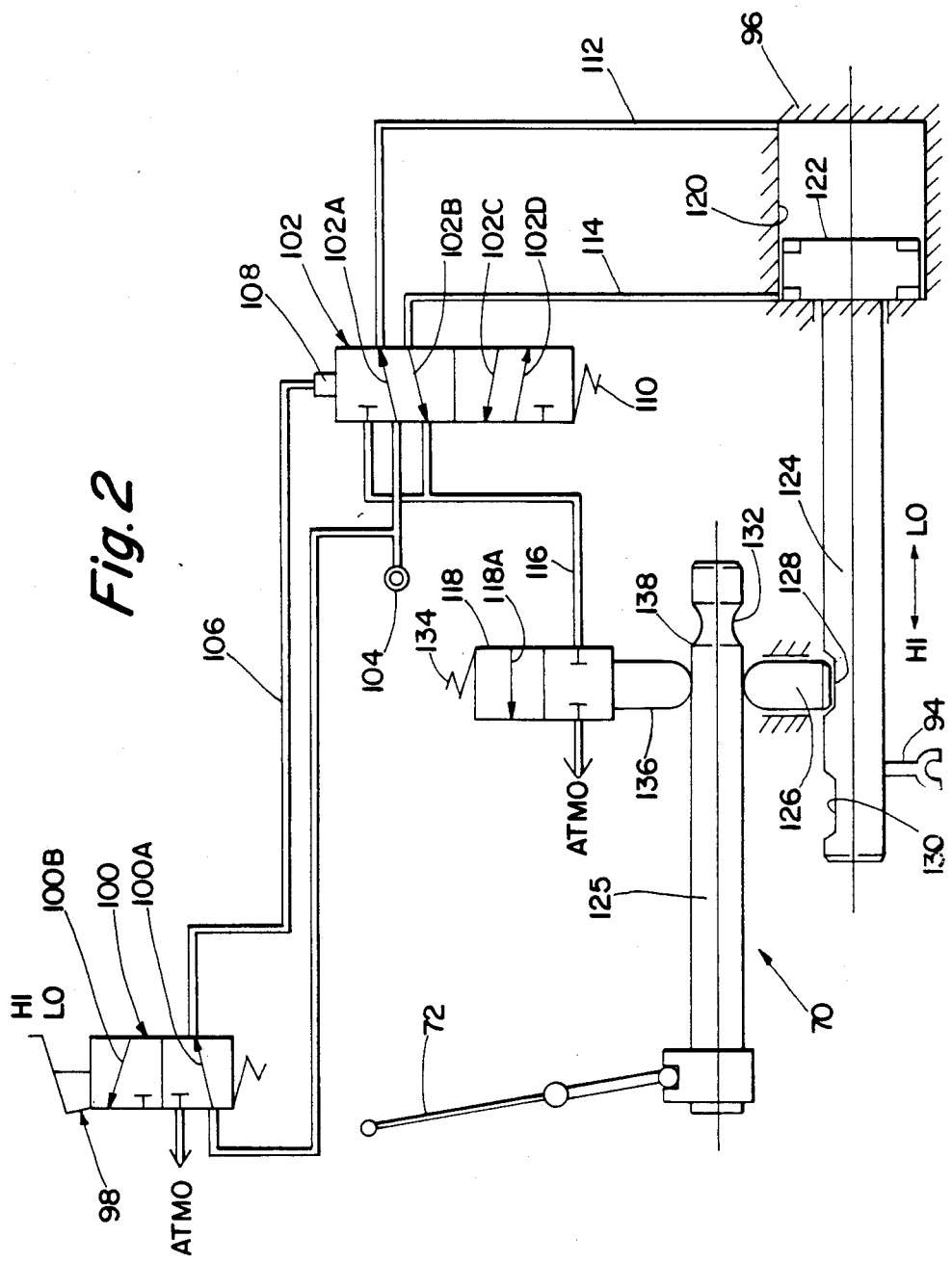

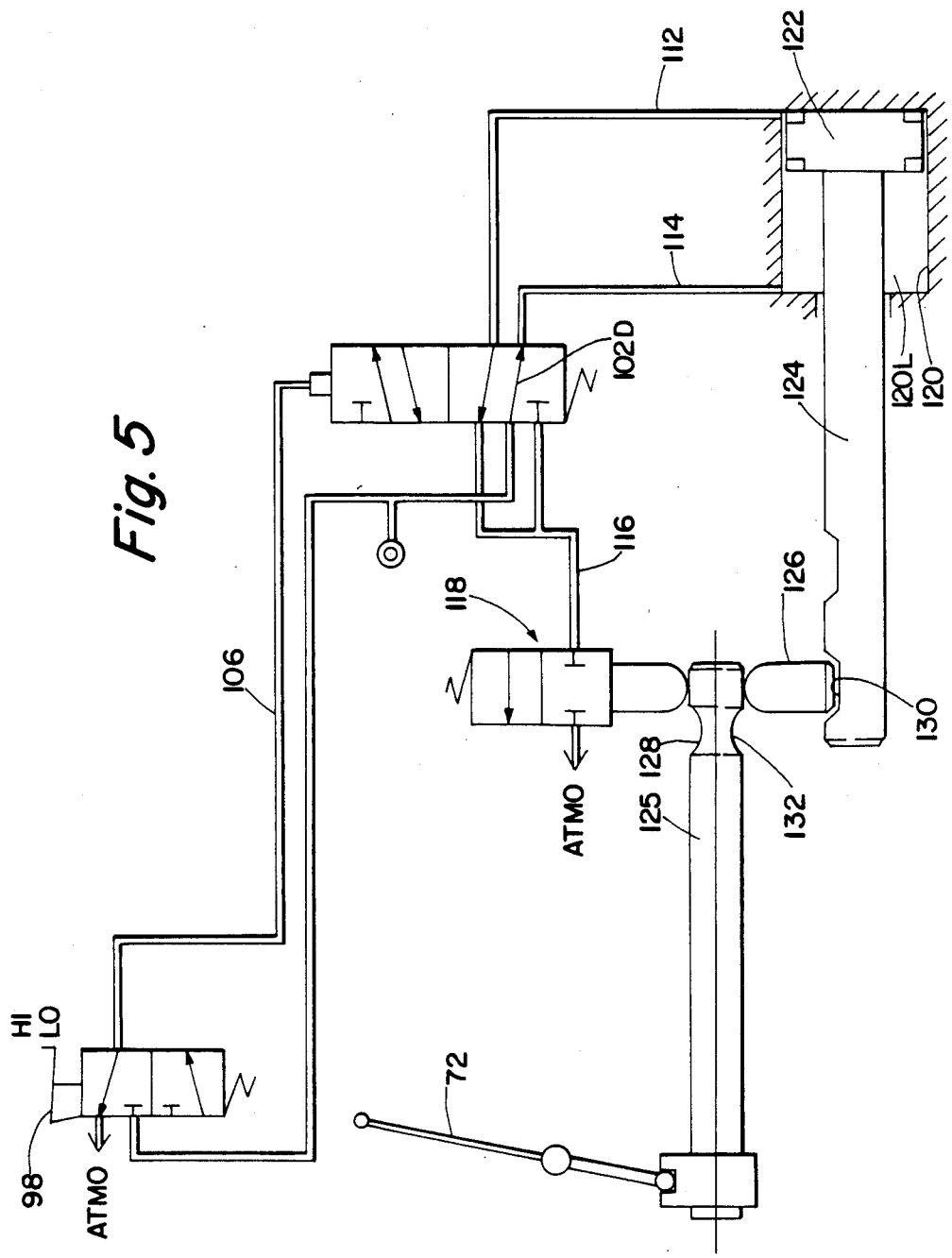

PNEUMATIC CONTROL SYSTEM FOR RANGE TYPE COMPOUND TRANSMISSION

BACKGROUND OF THE INVENTION

1. Field of the Invention

The present invention relates to a pneumatic, e.g. pressurized air operated, control system for shifting the auxiliary section of a compound transmission. In particular, the present invention relates to an improved pneumatic control and interlock system for range type compound transmission.

2. Description of the Prior Art

Compound transmissions of the range or combined range/splitter type are well known in the prior art as may be seen by reference to U.S. Pat. Nos. 3,105,395; 3,138,965; 3,171,300; 3,283,613 and 4,754,665, the disclosures of which are hereby incorporated by reference.

Briefly, such transmissions typically comprise a multiple speed main transmission section connected in series with a range type auxiliary section wherein the range step is greater than the total ratio coverage of the main transmission section.

In such transmissions, the main section is typically shifted by means of a shift bar housing assembly controlled by a manually operated shift lever or the like and the auxiliary range section is shifted by means of button or switch, usually manually operated, which controls a remote slave valve/actuator mechanism. As the range section often utilizes synchronized jaw clutches, to provide acceptable shift quality and prevent undue wear and/or damage to the range section synchronized jaw clutches, a range shift should be initiated and completed while the main transmission section is in neutral.

In view of the above, the prior art compound range type transmissions usually include a control systems, usually a pneumatic control system, including interlock devices, which allowed a range shift to be preselected by use of a selector button or switch at a master control valve but not initiated until the main transmission section is shifted to, or at least towards, the neutral condition. Such systems typically utilized interlocks of the mechanical type on the range section actuator mechanical linkage which physically prevented movement of the range section shift fork until the main section shifted into neutral or of the type wherein the valve supplying pressurized air to the range section piston is either disabled or not provided with pressurized fluid until a shift to main section neutral is sensed or is only activated and provided with pressurized fluid while the main section is shifted to and remains in neutral. Examples of such transmissions and the control systems therefor may be seen by reference to U.S. Pat. Nos. 2,654,268; 3,138,965 and 4,060,005, the disclosures of which are hereby incorporated by reference.

The prior art devices were not totally satisfactory as excessive stress was applied to the mechanical interlock/linkages, sever range section shifting could occur and/or the main transmission section could be re-engaged prior to completion of the range section shift which would result in damage to the range section synchronizers (especially during an upshift) or in stranding the range section in a disengaged condition.

SUMMARY OF THE INVENTION

In accordance with the present invention, the drawbacks of the prior art are minimized or overcome by the provision of a pneumatic control system for a range type compound transmission which does not place undue stress upon the mechanical linkage interlock members, and which provides rapid yet relatively smooth range shifting which will occur rapidly upon shifting of the main transmission section into or towards neutral, thereby minimizing or eliminating the possibility of the main transmission section being re-engaged prior to completion of a preselected auxiliary range section shift.

The above is accomplished by utilizing a pneumatic control system allowing preselection of a range shift and utilizing a mechanical linkage interlock which will physically prevent movement of the range section shift actuator (usually a piston) linkage members until such time as the main transmission section is in neutral. A two-position actuator piston is controlled by an actuator control valve, which valve selectively vents and pressurizes opposite chambers of the actuator cylinder for controlling operation of the range section shifting piston. The actuator control valve will immediately connect the appropriate chambers of the range section shifting actuator cylinder to pressurized fluid and to an exhaust conduit upon preselection of a range shift by the operator, however, the exhaust conduit is controlled by an exhaust valve which blocks fluid communication between the actuator cylinder chamber to be vented and atmosphere until such time as the main transmission section is shifted into or towards neutral.

Accordingly, upon preselection of a range shift, the actuator cylinder chamber to be pressurized is immediately connected to pressurize fluid but the piston is prevented from movement as the actuator cylinder chamber to be vented is blocked from an exhaust to atmosphere. Upon sensing of a shift of the main transmission section into neutral, the exhaust is opened allowing the chamber to be exhausted to communicate with atmosphere and allowing the range actuator piston to move to the preselected position thereof. It is understood that shifting of the main transmission section into neutral is intended to include shifting of the main section towards the neutral condition.

The advantages of utilizing the exhaust control valve are that it is possible to preselect a range section shift without overloading the mechanical linkage interlock members, the fact that compressed air is already behind the actuator piston when the mainsection moves into neutral means that a very fast range change is achieved and is not normally possible to obtain engagement in the main transmission section prior to engagement of the preselected range ratio, and the air buffer of the trapped air in the actuator cylinder chamber to be exhausted prevents too harsh of a shift which could result in a range section synchronizer malfunctioning.

Accordingly, it is an object of the present invention to provide a new and improved pneumatic control system for a compound range type transmission which will allow preselection of the range section shift, will minimize stresses on the mechanical linkage interlock members and will provide a rapid shifting of the range section upon sensing of a shift of the main transmission section into neutral without causing unduly harsh shifting of the range section.

These and other objects and advantages of the present invention will become apparent from a reading of the detailed description of the preferred embodiment taken in connection with the attached drawings.

BRIEF DESCRIPTION OF THE DRAWINGS

FIG. 2 is a block schematic drawing showing the pneumatic control system for a range type compound transmission of the present invention.

FIGS. 3-5 illustrate the pneumatic control system illustrated in FIG. 2 in other conditions of a range shifting operation.

DESCRIPTION OF THE PREFERRED EMBODIMENT

Figure 1:
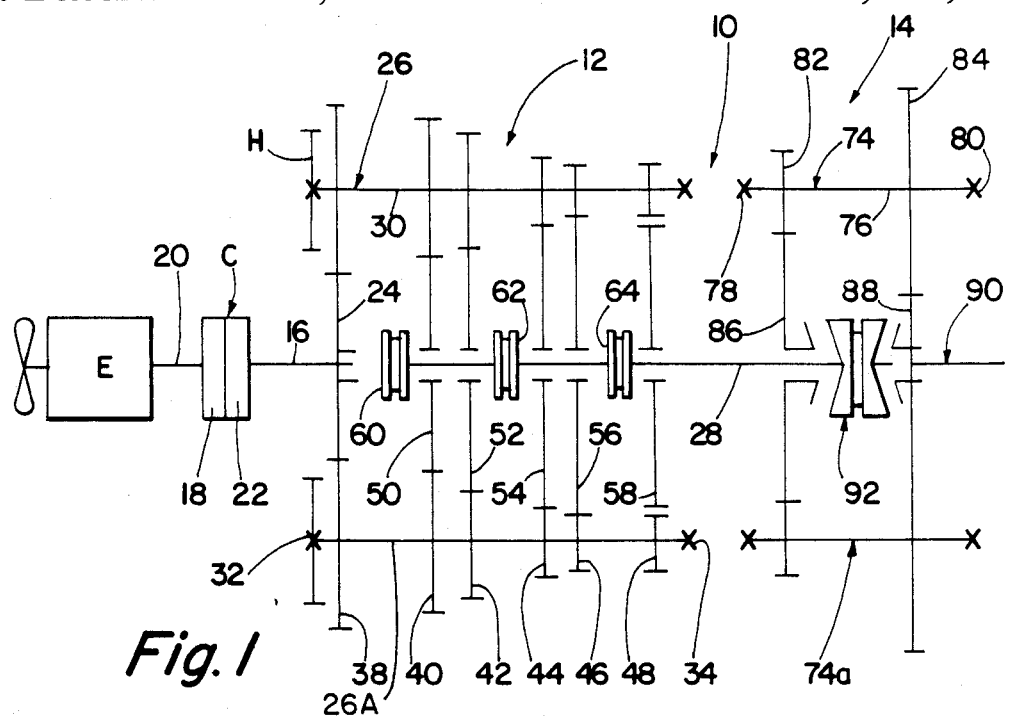
FIG. 1 is a schematic illustration of a compound transmission having a range type auxiliary section and utilizing the pneumatic control system of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate and substantially synchronous speed.

Figure 1A:
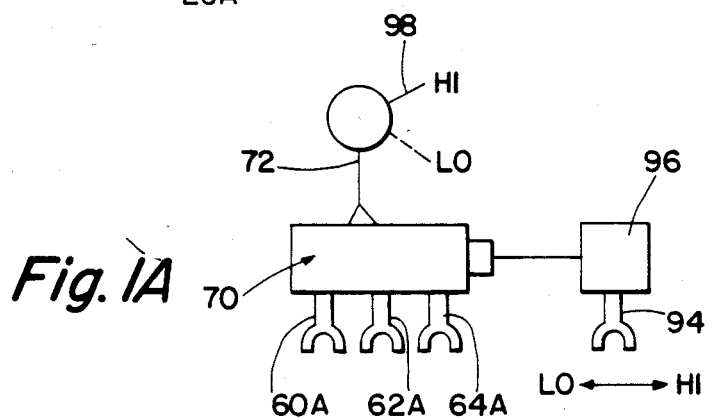
FIG. 1A is a schematic illustration of the shifting mechanisms of the transmission of FIG. 1.
Figure 1B:
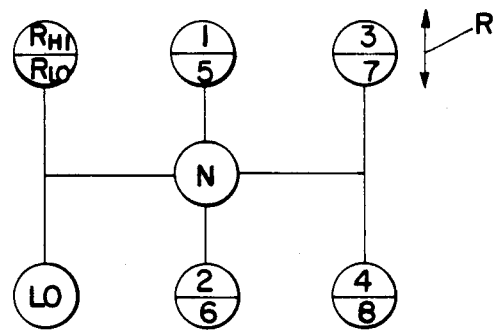
FIG. 1B is a schematic illustration of the shift pattern of the transmission of FIG. 1.

Referring to FIGS. 1, 1A and 1B, a range type compound transmission 10 is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as well known in the prior art. Clutch collars 60, 62 and 64 may be of the well known acting synchronized or nonsynchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of a shift lever 72. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and Carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of shift fork 94 and the range section shifting actuator assembly 96, is provided for clutching either gear 86 to mainshaft 28 for low range operation or gear 88 to mainshaft 28 for direct or high range operation of the compound transmission 10. The shift pattern for compound range type transmission 10 is schematically illustrated in FIG. 1B. Selection of low or high range operation of the transmission 10 is by means of an operator actuated switch or button 98 which is usually located at the shift lever 72.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62 or 64 may be of the synchronized jaw clutch type and transmission sections 12 and/or 14 may be of the single countershift type.

The pneumatic air control system for a range type compound transmission, such as transmission 10 illustrated above, may be appreciated in greater detail by reference to FIGS. 2-5.

Referring to FIG. 2, the range shift selector switch 98 which is typically located in the driver's cab, preferably at the knob portion 100 of the transmission shift lever 72, operates a two-way, two-position master valve 100 which is usually also located in the knob 100 of shift lever 72. The master control valve 100 controls a slave or piloted actuator control valve 102 which can handle relatively large air flows. When selector switch 98 positions master valve 100 in its upward position as shown in FIG. 2, air pressure supplied from a source 104 of pressurized, preferably pressurized, filtered and regulated, air is applied through an internal path 100A and a small board conduit 106 to a pilot operator 108 for positioning pilot operated actuator control valve 102 in its lower position thereof against the bias of spring 110. In this position, pilot operated actuator control valve 102 will supply pressurized fluid from source 104 through internal path 102A to conduit 112 while internal conduit 102B will connect conduit 114 to an exhaust conduit 116 which exhaust conduit 116, is controlled by an exhaust valve 118 to be described in greater detail below. Relatively large diameter low resistance fluid conduits 112 and 114, respectively, fluidly communicate with the right and left ends respectively, of the range piston cylinder 120 in which the range piston 122 is sealingly and slideably received.

As may be appreciated by reference to the drawings, pressurization of conduit 112 and exhaust of conduit 114 will result in range piston 122 being urged leftwardly to the high range position as illustrated in FIG. 2, while pressurization of conduit 114 and exhaust of conduit 112 result in range piston 122 being urged rightwardly to engage the low range position.

As may also be seen by reference to the drawings, placing range selector switch 98 in the low position will exhaust pilot passage 106 resulting in the pilot operated actuator control valve 102 moving to the upward position under the influence of spring 110 which will cause the internal passages 102C to connect passage 112 with the exhaust passage 116 and internal passage 102D to connect the pressure conduit 114 with the source of pressurized fluid 104.

The range actuator piston 122 carries a range actuator shaft 124 for axial movement therewith which may also carry the range section shift fork 94 fixed thereto.

The main transmission section 12 is controlled by axial movement of at least one shift rail 125 contained within the shift bar housing 70 and controlled by operation of the shift lever 72. Devices of this type are well known in the prior art and may be seen by reference to U.S. Pat. No. 4,621,537, the disclosure of which is hereby incorporated by reference. A mechanical interlock member 126 cooperates with notches 128 and 130 provided in the range piston shaft 124 to lock the range piston 122 in the high or low position thereof until such time as main section neutral is sensed by notch 132 provided the main section shift rod 125 axially aligning with the interlock link member 126. Of course, by extending the axial length of neutral indicating notch 132, alignment of notch 132 with interlock member 126 will indicate a main section shift towards neutral as well as main section neutral. Mechanical interlock mechanisms of the type illustrated between the main transmission section and auxiliary transmission section shifting linkages are well known in the prior art.

In the event the main transmission section shift bar housing 70 is of the more conventional multiple shift rail type, other types of neutral indicating structures will be required. Such structures are known in the prior art as may be seen by reference to U.S. Pat. Nos. 4,748,863; 4,722,237 and 4,614,126, the disclosures of which are incorporated by reference.

The control system of the present invention differs from the prior art in that the exhaust control valve 118 is provided for controlling the communication of exhaust passage 116 with atmosphere. Briefly, exhaust control valve 118 is a two-position valve having a first position shown which will block communication of the exhaust passage 116 from the atmosphere and a second position, which the valve will assume under the bias of spring 134 when the main transmission section is in neutral, allowing internal passage 118A to communicate exhaust passage 116 with atmosphere. A plunger member 136, which will cooperate with a groove 138 provided in the main section shift rail 125, may be utilized to allow the exhaust valve 118 to sense a main transmission section neutral condition. As shown, grooves 132 and 138 may be axially aligned and/or comprise a unitary annular groove in shift rail 125.

In the event that the range section is to have more than two selectable speeds, a third groove in the range selector shaft 124 in addition to the grooves 128 and 130 may be provided and actuator piston 122 will be a more than two-position device requiring a somewhat more complicated control valving structure.

The purposes of the interlock member 126 and the groove 132 in the main section shift rail 125 and grooves 128 and 130 in the range section actuator shaft 124 are, as is well known, that the auxiliary section actuator piston 122 is mechanically locked in either the high or the low position thereof until such time as the main section 12 is shifted to neutral and, once the main section has obtained a neutral position and a range section shift is in progress, the main section 12 will be locked in neutral. While this has the advantage of properly sequencing a compound shift, i.e. a shift of both the main 12 and auxiliary 14 transmission sections, a potential disadvantage is that undue stress may be applied to the interlock member by preselection of a range shift if the piston 122 is immediately biased to change positions and/or an operator attempts to complete a main section shift while the range shift is in progress. Further, if a range section shift is preselected and one side or chamber of the actuator cylinder is immediately pressurized and the other side of the actuator cylinder immediately evacuated, upon release of the interlock mechanism, a relatively harsh range section shift might occur which would be objectionable to the vehicle operator and might also result in the crash-through or other improper operation of the range section synchronizer mechanism.

The operation and advantages of the present invention will be discussed above in connection with the compound shift, that is a shift in both the main 12 and auxiliary 14 transmission sections, from fifth gear to fourth gear. FIG. 2 illustrates the control system with the transmission 10 in fifth gear. In this condition, clutch collar 62 engages mainshaft gear 54 to the mainshaft 28 and clutch collar 92 engages output gear 88 and output shaft 90 directly to the mainshaft 28 bypassing the range section reduction gearing. To engage fourth gear, clutch collar 62 must disengage mainshaft gear 54 from mainshaft 28, then synchronized clutch collar 92 must move from the full rightward to the full leftward position thereof to engage the low range by engaging range gear 86 to the mainshaft 28, and then clutch collar 60 must be moved leftwardly to engage input gear 24 and input shaft 16 directly to the main shaft 28.

Figure 3:
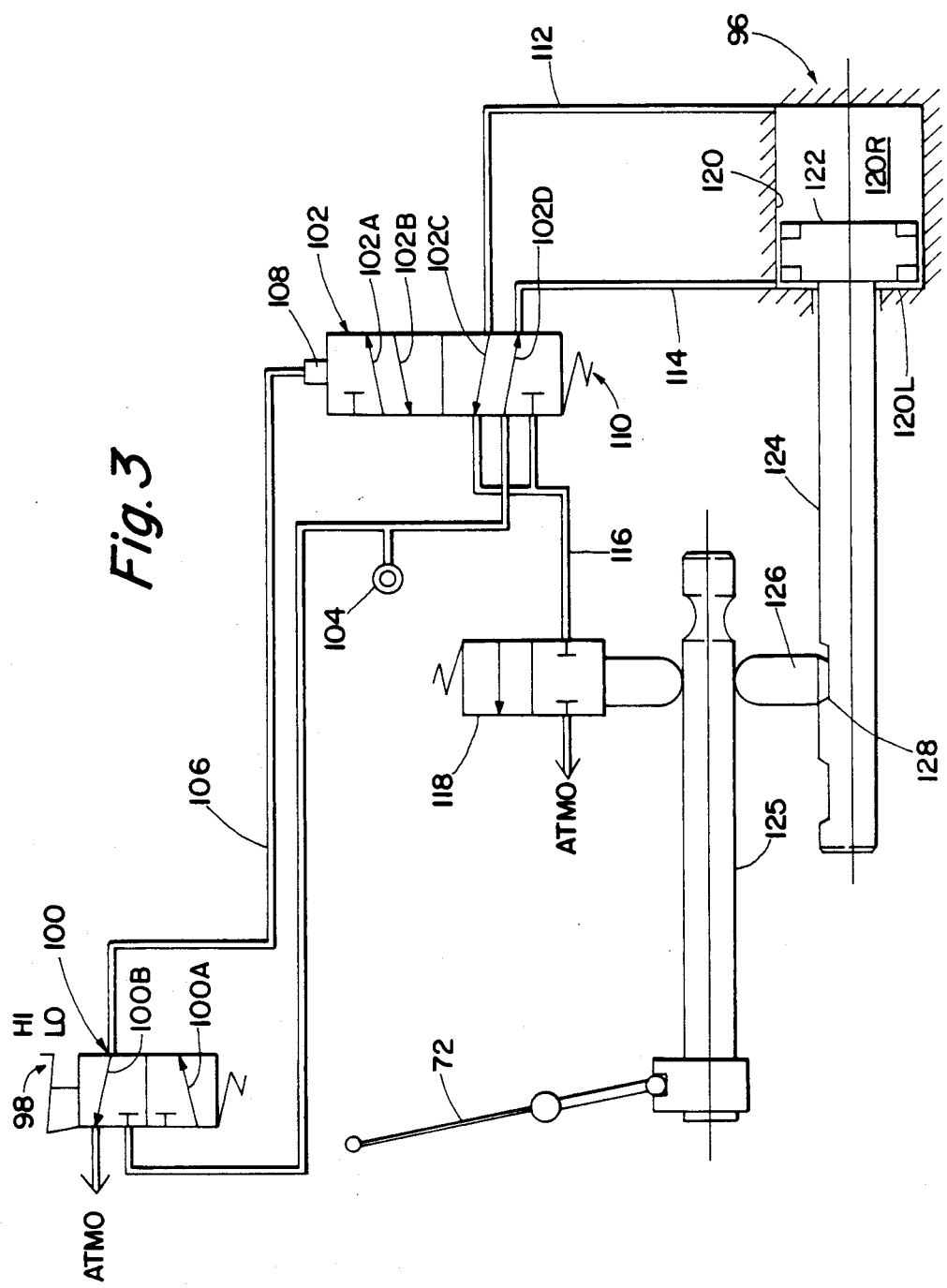

Referring to FIG. 3, the vehicle operator will first preselect the low range position at selection switch 98 which will cause the pilot or master valve 100 to move downwardly as shown causing internal passage 100B to vent pilot conduit 106 to atmosphere whereby the pilot valve operator 108 will allow the pilot operated actuator control valve 102 to move upwardly under the influence of spring 110 whereby internal conduit 102C will fluidly connect conduit 112 with the exhaust conduit 116 while the internal conduit 102D will fluidly connect the conduit 114 the source of pressurized fluid 104. Accordingly, pressurized fluid is applied via conduit 114 to the leftward chamber 120L of cylinder 120. However, as conduit 112 is prevented from communicating with atmosphere by the exhaust control valve 118, the pressure drop in the rightward chamber 120R of cylinder 120 is relatively small and acts as a buffer to prevent excessive forces from being applied to the mechanical interlock mechanism as link member 126 engages the ramp 128 provided in the main selector shaft 124.

Figure 4:
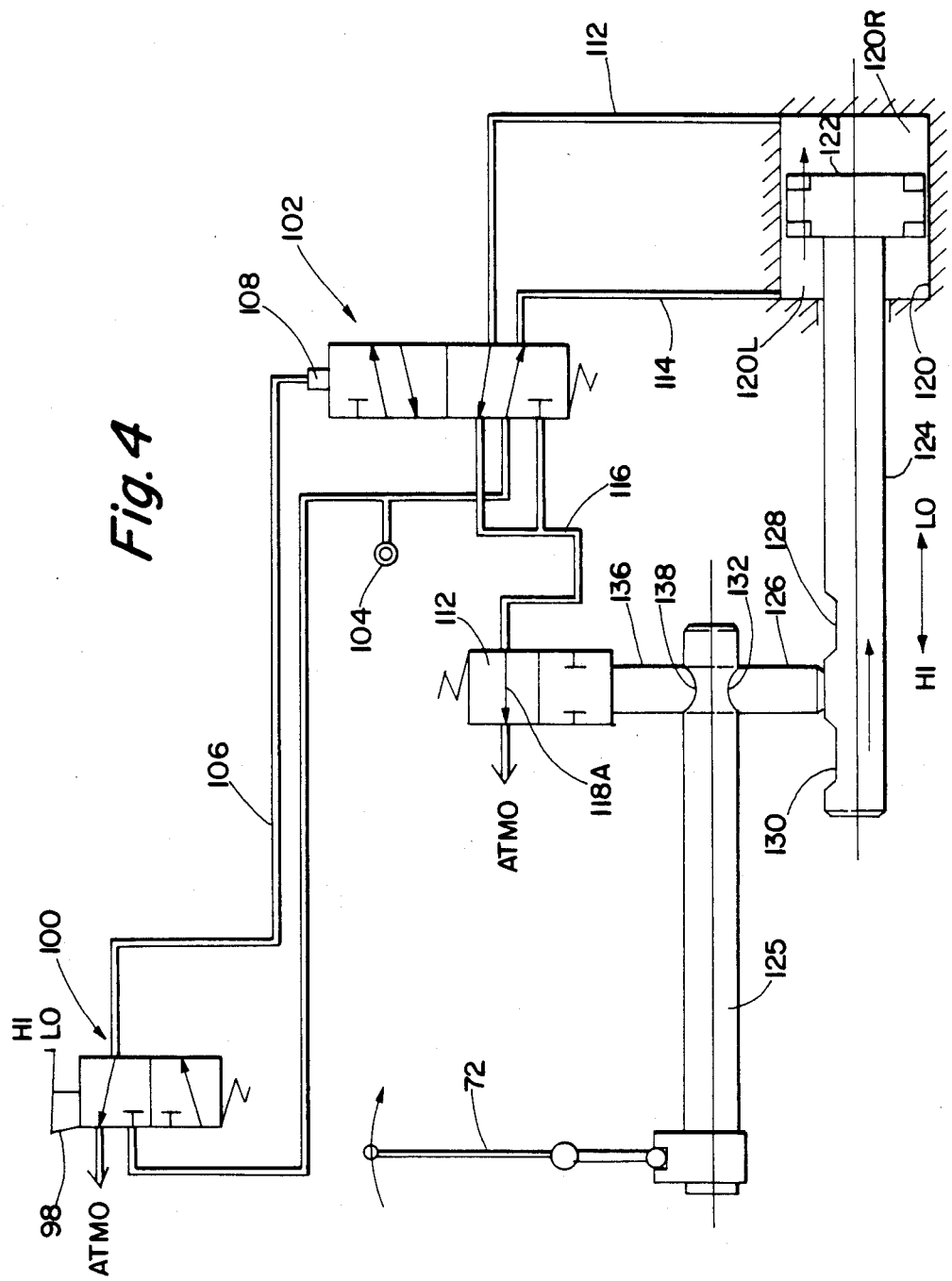

Referring to FIG. 4, as the operator then moves the shift lever 72 to shift the main transmission section to neutral causing the main transmission shift rail 125 to assume the position wherein neutral indicating notches 132 and 138 will align with the neutral interlock link 126 and with the neutral sensing exhaust valve plunger 136 of the exhaust control valve 118, the exhaust control valve 118 will move to its low position wherein internal passage 118A will cause exhaust passage 116 to communicate with atmosphere allowing passage 112 to vent the rightward chamber 120R of range shift cylinder 120 whereby the pressurized fluid in the leftward chamber 120L will cause the range shift piston 122 to begin to move rightwardly towards engagement of the low range. It is noted, that in this position, when the range shift is in progress, the interlock link 126 will engage a land portion between the notches 130 and 128 of range actuator shaft 124 causing the main section shift rail 125 to be locked in the neutral position thereof.

Due to the fact that the compressed air has been allowed to build up in the leftward chamber 120L of the range shift cylinder, when the driver moves the main section into neutral a very fast range change is achieved and it is highly unlikely, or impossible, to obtain a main section engagement prior to engagement of the preselected range section ratio. Further, the air buffer provided by the trapped air in the rightward chamber 120R of the range cylinder prevents too harsh a shift in the range section which could be objectionable to the vehicle operator and/or result in malfunctioning of the range synchronizer.

FIG. 5 illustrates a completed shift to fourth gear. As may be seen, the range piston 122 has moved to its completely rightward position in range cylinder 120 which allowed the interlock link 126 to be received in groove 130 prOvided in the range actuator shaft 124 to allow the operator to manipulate the shift lever 72 to cause engagement in the main transmission section which will once again cause the interlock mechanism to prevent movement of the range piston. The exhaust neutral control valve 118 has again been urged to the position wherein exhaust conduit 116 is blocked from atmosphere. Internal passage 102D of actuator control valve 102 continues to cause conduit 114 to fluidly communicate with the source of pressurized fluid 104 whereby pressurized fluid continues to be provided to chamber 120L of the range cylinder.

Accordingly, it can be seen that it is an important feature of the present invention that upon preselection of a range section shift, the appropriate side of the range piston cylinder is immediately pressurized but that means are provided, such as exhaust control valve 118, to ensure that the side of the range piston cylinder to be exhausted to accomplish the desired range shift is not in fact allowed to be fully exhausted until such time as the main transmission section is shifted into, or at least towards, a neutral condition thereof.

Provided the main section transits through the neutral condition at some point during an attempted shift of the auxiliary section, the auxiliary section shift will be started and completed. Otherwise, any selected auxiliary section shift will be impeded by both the mechanical interlock and back pressure on the actuator piston.

Accordingly, it may be seen that a new and improved pneumatic control system for controlling the shifting of a range type compound transmission has been provided. While the controls have been described in the context of a compound shift, the same operation and advantages apply in the unlikely event of a range only shift, i.e., the control system will allow such a shift to be initiated and completed only if the main section is shifted into neutral.

While the preferred embodiment of the present invention has been described with a certain degree of particularity, it is understood that various modification, rearrangement and/or substitution of the components thereof is possible without departing from the spirit and the scope of the invention as hereinafter claimed.

I claim:

1. A pressurized fluid operated control system for a compound transmission (10) comprising a multiple speed main transmission section (12) connected in series with a multiple speed auxiliary transmission section (14), said main transmission section having a selectable neutral position and said auxiliary transmission section shiftable to a selected one of said multiple auxiliary section speed ratios, operator actuated selection means (72, 98) allowing selection of a selected main transmission section ratio or said main transmission section neutral position and (98) allowing preselection of a selected auxiliary transmission section ratio, a main transmission section shifting mechanism (70), an auxiliary shifting mechanism (96) comprising a fluid actuated actuator piston (122) slideably and sealingly received in an actuator cylinder (120) defining a first (120R) and second (120L) cylinder chamber, shifting from one of said auxiliary section speed ratios to another of said auxiliary section speed ratios requiring simultaneous pressurization of one of said cylinder chambers and exhausting of the other of said cylinder chambers, said control characterized by:

actuator control valve means (102) controlled by said operator actuated selection means (98), independent of the neutral/not neutral condition of the main transmission section, to connect a selected one of said cylinder chambers to a source of pressurized fluid and to connect the other of said cylinder chambers to an exhaust conduit (116) and an exhaust conduit control means (118) having a first position blocking said exhaust conduit (FIG. 2) and a second position communicating said exhaust conduit to atmosphere (FIG. 4), said exhaust conduit control means including means (136, 138) to sense the neutral/not neutral condition of said main transmission section and operable to assume said first condition when said main transmission section is not in the neutral condition and to assume said second position when said main transmission section is in the neutral condition.

2. The control system of claim 1 additionally comprising a mechanical interlock mechanism (126) effective to mechanically inhibit movement of said auxiliary section actuator piston (122) in said cylinder (120) when said main transmission section is not in a neutral condition.

3. The control system of claim 2 wherein said mechanical interlock mechanism is additionally operable to prevent shifting of said main transmission section from the neutral condition thereof when said auxiliary transmission section is not fully engaged in one of the selectable ratios thereof.

4. The control system of claim 3 wherein said exhaust conduit control means comprises a two part, two-position valve operable by a plunger (136) interacting with a neutral indicating notch (138) associated with an axially moveable shaft (125) in said main transmission section shifting mechanism (70).

5. The control system of claim 1 wherein said auxiliary transmission section comprises a range type auxiliary transmission section.

6. The control system of claim 5 wherein said range type auxiliary transmission section is engageable by means of synchronized jaw clutch devices (92).

7. The control system of claim 1 wherein said pressurized fluid comprises pressurized air.

8. A compound transmission (10) comprising a multiple speed main transmission section (12) connected in series with a multiple speed auxiliary transmission section (14) in which compound shifts (4th-5th) of both the main transmission section (12) and the auxiliary transmission section (14) are permitted, shifts of the auxiliary transmission section powered by a pneumatic source (104) controlled by actuator control valve means (102) effective to connect a selected one of two actuator conduits (112, 114) to said pneumatic source (104) and to connect the other of said two actuator conduits to an exhaust conduit (116) for creating a significant pressure differential across a pneumatic actuator (120, 122), said compound transmission characterized in that said exhaust conduit (116) is controlled by an exhaust conduit control valve (118) effective to block communication of said exhaust conduit with atmosphere unless said main transmission section is shifted into neutral, wherein said compound transmission includes an operator actuated switch (98) allowing the operator to select an auxiliary transmission section shift, said actuator control valve means (102) controlled by said switch independently of said main transmission section being or not being in a neutral condition.

9. The compound transmission of claim 8 further characterized in that movement of said pneumatic actuator is mechanically impeded by a mechanical interlock assembly (126, 128, 130, 132) until said main transmission section (12) is shifted into neutral.

10. The compound transmission of claim 9 wherein said mechanical interlock assembly is also effective to prevent said main transmission section from being shifted out of neutral during an auxiliary transmission shifting operation.

11. The compound transmission of claim 9 wherein said compound transmission includes an operator acdtuated switch (98) allowing the operator to select an auxiliary transmission section shift, said actuator control valve means (102) controlled by said switch independently of said main transmission section being or not being in a neutral condition.

12. The compound transmission of claim 9 wherein said main transmission section (12) includes a single control shaft (125) the axial position of which is indicative of the main transmission section being or not being in a neutral condition.

13. The compound transmission of claim 12 wherein said mechanical interlock and said exhaust conduit control valve each include means (126, 136) responsive to the axial position of said single control shaft (125).

* * * * *